May 29, 1934.    J. LAMOND    1,961,003

THREADING TOOL

Filed Sept. 28, 1932

INVENTOR
John Lamond,
By Archworth Martin,
Attorney.

Patented May 29, 1934

1,961,003

UNITED STATES PATENT OFFICE 1,961,003

THREADING TOOL

John Lamond, Allison Park, Pa.

Application September 28, 1932, Serial No. 635,138

4 Claims. (Cl. 10—141)

My invention relates to thread-cutting tools, such as taps, dies, chasers, hobs and the like.

One object of my invention is to provide a threading tool of such form that it may readily be reconditioned a large number of times and hence have longer life and be less expensive to maintain in working condition than various types of threading devices heretofore employed.

Another object of my invention is to further combine roughing and finishing teeth in a single threading tool so that reconditioning of the tool may be effected without affecting or changing the shape of the threads produced by the tool.

A further object of my invention is to provide a threading tool whereby threads of greater smoothness may be produced and whereby tendency for "stickers" to accumulate at the roots of the cutting teeth is reduced or entirely avoided.

Figure 1:
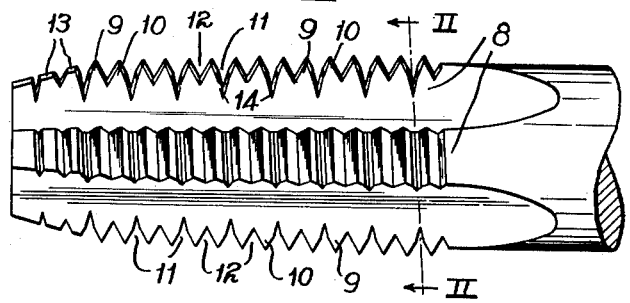
Figure 2:
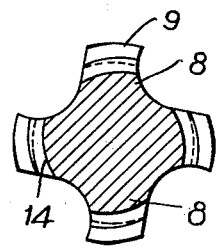
Figure 3:
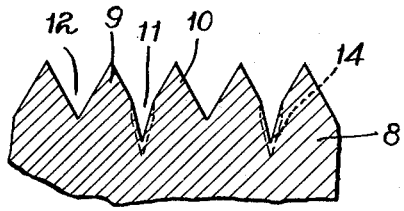
Figure 4:
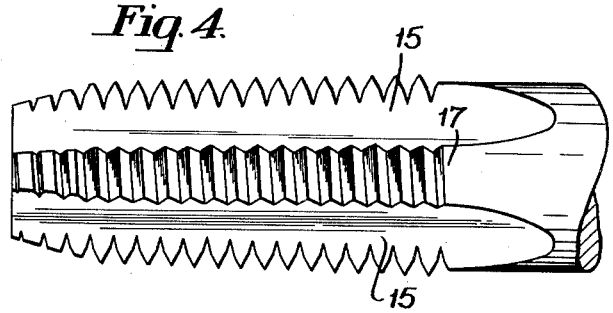
Figure 5:
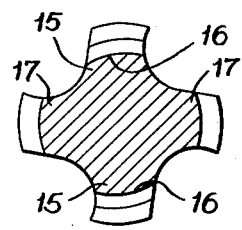
Figure 6:
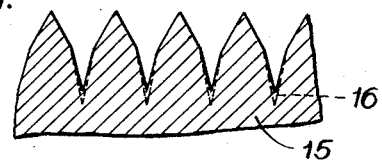
Figure 7:
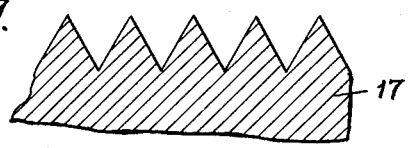

Some of the forms which my invention may take are shown in the accompanying drawing wherein Figure 1 is a side view of a tap; Fig. 2 is a view taken on the line II—II of Fig. 1; Fig. 3 is a longitudinal sectional view, on an enlarged scale, of a portion of the structure of Fig. 1; Fig. 4 is a view similar to that of Fig. 1, but showing a modified form of tap; Fig. 5 is a cross-sectional view thereof; Fig. 6 is an enlarged sectional view showing a form of the teeth A of Fig. 4, and Fig. 7 is an enlarged sectional view showing certain of the teeth B of Fig. 4.

The invention as hereinafter described is particularly suitable in the forming of tapered threads, but is, of course, suitable for various other kinds of threading work.

Referring first to Figs. 1, 2 and 3, I show a tap having lands 8 provided with cutting teeth 9 and 10. The teeth 9 and 10 are so relieved that their sides which define the spaces 11 will function as roughing elements, while their sides which define the spaces 12 will function as finishing elements, these spaces may be cut to uniform depths through the length of the tool, but preferably have root relief from the face to the heel, of approximately .0005 inch. The tops of the teeth adjacent to the lead end of the tool are cut away as at 13, especially when the tap is to be employed in the cutting of threads along tapering lines.

The roughing surfaces at 11 have their roots relieved from the face of the land 8 to the heel thereof, as indicated at 14 and relieved to a greater depth than are the cutting surfaces at 12. This root relief possesses the advantages described in my copending application No. 567,205, filed October 6, 1931 (now Patent No. 1,881,281), such advantages including elimination of the tendency for stickers to accumulate at the roots and thereby produce imperfect threads, and permitting the convenient reconditioning of the roughing teeth by merely grinding the faces of the land. If desired, the roots at the lead end of the tap can be cut to points closer to the axis of the tap, and will necessarily be cut to such point, where the tap is to be employed in the cutting of tapered threads.

As shown more clearly in Fig. 3, the cutting faces at 11 will each cut the material away on lines angular to one another, thus the outer angular area may be 60° and the inner area, adjacent to the roots of the teeth, may be of 30° angularity. The teeth are so positioned relative to one another that a roughing area at 11 will precede a finishing cut at 12. The cut at 12 removes the material that is left adjacent to the roots of the rough-cutting surfaces. The finished thread will therefore be of 60° angularity throughout its sides. Since there is a relatively small amount of material to be removed on the finishing cut, the cutting surfaces at 12 need not be relieved, except perhaps at their roots, as heretofore stated.

By the alternate arrangement of rough-cutting surfaces and the unrelieved finish cutting surfaces, the grinding of the faces of the lands throughout the lengths thereof will not impair the cutting character of the teeth and these grindings may be repeatedly made for the purpose of reconditioning the teeth and particularly the rough cutting surfaces thereof.

In Figs. 4 to 6, I show a tap wherein two opposite lands 15 are provided with cutting teeth whose sides are relieved approximately 60° toward their tops and which are relieved to approximately 30° adjacent to their roots, to produce a cut similar to that outlined at 11, the roots of the teeth being relieved at 16 to a greater extent than the tops and sides hereof, and from the face of the lands to the heels thereof. The tops and sides of these teeth being relieved only from points rearwardly of the face of the land.

Lands 17 are provided with unrelieved teeth which perform the finishing operation on the threads which are rough-cut by the teeth on the lands 15, the finishing cut giving the threads their final contour of 60°, for example.

It will, of course, be understood that I do no limit myself to the degree or angularity of cuts to be made, but consider it an important feature of my invention that the preliminary cut initially produces a rough thread whose sides are of decreased angularity toward the roots of the cutting teeth (tops of the threads).

Substantially the only reconditioning required for the tap of Fig. 4 is at the roughing teeth, this conditioning being effected by simply grinding away the faces of the lands 15, and they can be repeatedly ground by a simple grinding operation and the life of the tap thereby greatly increased.

I claim as my invention:

1. A threading tool having cutting tooth edges arranged to produce a roughing cut, and cutting tooth edges arranged to produce a finishing cut, the rough cutting edges being relieved at their roots to a greater depth than are the finishing edges, with the angularity of the cutting edges adjacent to said roots being less than the angularity of the said edges for producing finishing cuts.

2. A tapered threading tool having cutting tooth edges for producing roughing cuts, and cutting tooth edges arranged to produce a finishing cut, each pair of rough-cutting edges being immediately followed by a pair of finished cutting edges, and the rough-cutting edges being relieved to a greater depth than the finish cutting edges.

3. A tapered threading tool having a plurality of lands, each land being provided with alternately arranged rough-cutting tooth edges and finish cutting tooth edges, the rough-cutting edges being relieved to a greater depth than are the finish-cutting edges.

4. A tapered threading tool having a plurality of lands, certain of the lands being provided with cutting tooth edges arranged to produce roughing cuts, and other lands being provided with cutting tooth edges arranged to produce finishing cuts, the rough-cutting edges being relieved to a greater depth than are the finish cutting edges, each pair of rough-cutting edges being immediately followed in a spiral path by a pair of finish-cutting edges.

JOHN LAMOND.